US007170660B2

(12) United States Patent
Nakajima

(10) Patent No.: US 7,170,660 B2
(45) Date of Patent: Jan. 30, 2007

(54) OPTICAL SCANNER AND IMAGE FORMING DEVICE

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 924 days.

(21) Appl. No.: 10/127,768

(22) Filed: Apr. 23, 2002

(65) Prior Publication Data

US 2002/0171878 A1 Nov. 21, 2002

(30) Foreign Application Priority Data

Apr. 24, 2001 (JP) ............................ 2001-125270
Apr. 24, 2001 (JP) ............................ 2001-125542

(51) Int. Cl.
*H04N 1/46* (2006.01)

(52) U.S. Cl. ...................... 358/505; 358/513; 358/514; 358/474; 250/208.1

(58) Field of Classification Search ................ 358/505, 358/513, 514, 408, 474, 479, 481, 482, 483, 358/488, 494; 250/208.1, 208.2; 355/45
See application file for complete search history.

(56) References Cited

U.S. PATENT DOCUMENTS 5,023,442 A * 6/1991 Taniguchi et al. ....... 250/208.1
5,107,280 A 4/1992 Ohashi et al.
5,117,295 A * 5/1992 Smitt ......................... 358/474
5,162,919 A * 11/1992 Ono ........................... 358/302
5,187,358 A * 2/1993 Setani ..................... 250/208.1
5,333,066 A * 7/1994 Sugata ....................... 358/471
5,633,744 A 5/1997 Nakajima
5,753,907 A 5/1998 Nakajima et al.
5,768,023 A * 6/1998 Sawaki et al. ............. 359/622
5,786,594 A 7/1998 Ito et al.
5,793,408 A 8/1998 Nakajima
5,930,433 A * 7/1999 Williamson et al. ........ 385/116
5,936,756 A 8/1999 Nakajima
5,999,345 A 12/1999 Nakajima et al.
6,052,211 A 4/2000 Nakajima
6,091,534 A 7/2000 Nakajima
6,252,220 B1 * 6/2001 Jedlicka et al. .......... 250/208.1
6,462,841 B1 * 10/2002 Tabata et al. ............... 358/475
6,475,711 B1 * 11/2002 Cook et al. ................. 430/363

(Continued)

FOREIGN PATENT DOCUMENTS

JP 03-098066 4/1991

(Continued)

*Primary Examiner*—Jerome Grant, II
(74) *Attorney, Agent, or Firm*—Dickstein Shapiro LLP

(57) ABSTRACT

An image forming device comprises a plurality of unit modules arranged in a main scanning direction, each unit module having a light source that modulates according to image data and a deflection unit which deflects the light emitted from the light source to scan a surface to be scanned. Areas scanned with each unit module are joined together to record the image. The image data includes fixed pixel areas in number equal to the number of the unit modules and which have one scanning line in common with the adjacent fixed pixel area, and variable pixel areas that link up the fixed pixel areas. The image data is constructed by adding pixels of each unit module to the variable pixel areas at a record start side or a record stop side of the fixed pixel areas, and the variable pixel areas are commonly shared between two neighboring unit modules.

17 Claims, 13 Drawing Sheets

5mm
300
306
305
304
303
302
301-1
301-2
301-3

U.S. PATENT DOCUMENTS

2001/0043317 A1* 11/2001 Shinada ........................ 355/41
2002/0159099 A1* 10/2002 Huang et al. ............... 358/494
2003/0117667 A1* 6/2003 Eguchi ........................ 358/407

FOREIGN PATENT DOCUMENTS

JP 3-161778 7/1991
JP 04-212564 * 4/1992
JP 2636984 4/1997
JP 10-239613 9/1998
JP 11-308430 * 5/1999
JP 2000-19438 1/2000

* cited by examiner

FIG.4

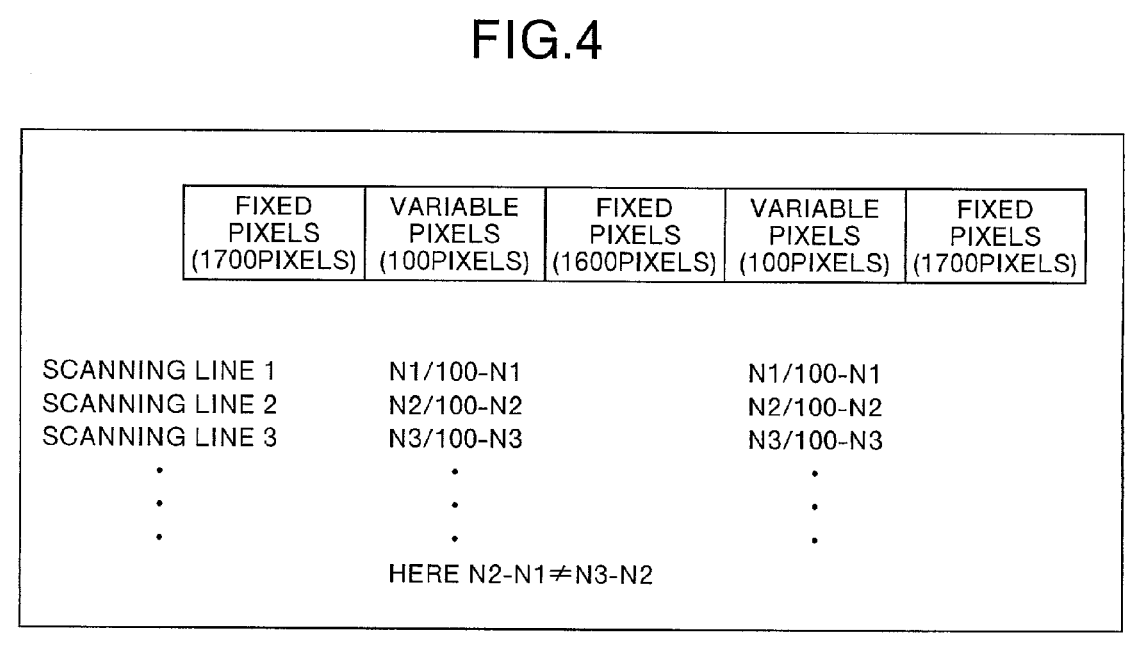

| FIXED PIXELS (1700PIXELS) | VARIABLE PIXELS (100PIXELS) | FIXED PIXELS (1600PIXELS) | VARIABLE PIXELS (100PIXELS) | FIXED PIXELS (1700PIXELS) |
|---|---|---|---|---|

| | VARIABLE PIXELS | VARIABLE PIXELS |
|---|---|---|
| SCANNING LINE 1 | N1/100-N1 | N1/100-N1 |
| SCANNING LINE 2 | N2/100-N2 | N2/100-N2 |
| SCANNING LINE 3 | N3/100-N3 | N3/100-N3 |
| ⋮ | ⋮ | ⋮ |

HERE N2-N1≠N3-N2

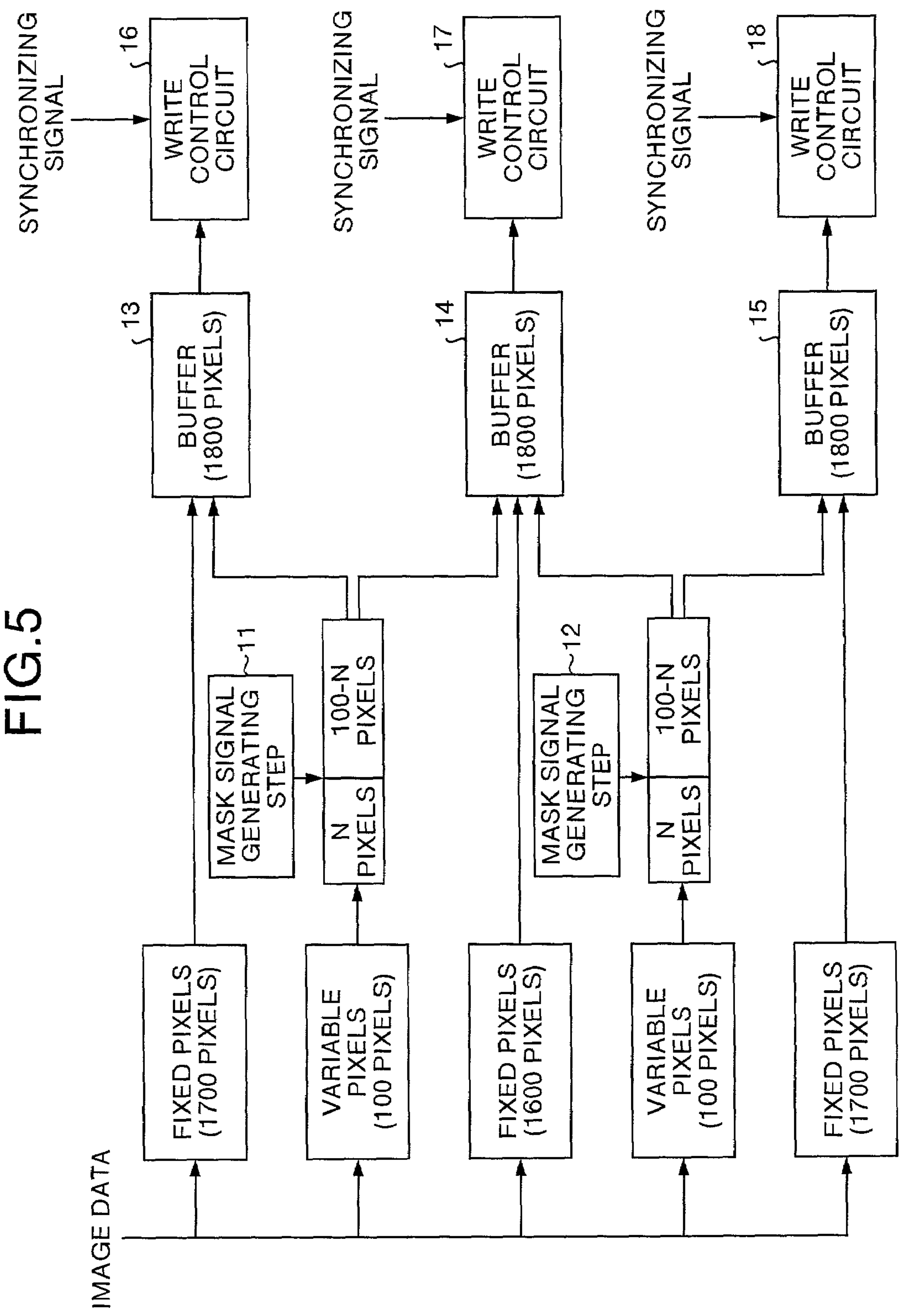
FIG.5
IMAGE DATA
FIXED PIXELS (1700 PIXELS)
VARIABLE PIXELS (100 PIXELS)
FIXED PIXELS (1600 PIXELS)
VARIABLE PIXELS (100 PIXELS)
FIXED PIXELS (1700 PIXELS)
MASK SIGNAL GENERATING STEP
11
N PIXELS
100-N PIXELS
MASK SIGNAL GENERATING STEP
12
N PIXELS
100-N PIXELS
BUFFER (1800 PIXELS)
13
BUFFER (1800 PIXELS)
14
BUFFER (1800 PIXELS)
15
WRITE CONTROL CIRCUIT
16
WRITE CONTROL CIRCUIT
17
WRITE CONTROL CIRCUIT
18
SYNCHRONIZING SIGNAL
SYNCHRONIZING SIGNAL
SYNCHRONIZING SIGNAL

OPTICAL SCANNER AND IMAGE FORMING DEVICE

FIELD OF THE INVENTION

This invention relates to a digital duplicator and to the optical scanner used in the write system of laser printers and of other image forming devices.

BACKGROUND OF THE INVENTION

Conventionally, when sensitive bodies are to be exposed over a wide range by means of an optical scanner, it has been required that the polygon mirror, scanner lens and/or other optical parts used be suitably upsized, or that to keep high image quality the parts precision and accuracy be maintained. Accordingly, as is disclosed in Japanese Patent Application Laid-Open No. 161778-1991 (hereunder called conventional example 1), there is provided a system whereby the range of exposure of sensitive bodies is divided, each division being fitted with a downsized optical scanner to carry out scanning and exposure. Under this system of conventional example 1, however, environmental changes and otherwise consequential deviations in parts precision or in optical magnification induce optical scanners to unfavorably overlap in the range of exposure, a defect which in the images produced is marked by the prominence of the boundaries of division.

Thereupon, in the Patent Specification No. 2,636,984 (hereunder called conventional example 2) is given a proposition that every scanning region be provided with overlapped areas in which their different pixels are intermixed to render the divided boundaries inconspicuous.

Further, in Japanese Patent Application Laid-Open No. 239613-1998 (hereinafter referred to as conventional example 3), where a system is introduced under which divided regions are sequentially recorded by using an optical scanner, it is proposed that in the connected (boundary) regions the fast scanning lines in partly drawn patterns on both sides of connection be linked up and synthesized at random points so as to randomly disperse the joints (seams) in the scanning regions to thereby make the joints inconspicuous.

Furthermore, Japanese Patent Application Laid-Open No. 161778-1991 and Japanese Patent Application Laid-Open No. 19438-2000 disclose a system in which the range of exposure of sensitive bodies is divided, with each division installed with a downsized optical scanner to conduct scanning and disclosure. Under this system, toners and dust particulates tend with age to get wind-borne and scatter to spoil the optical scanning system, resulting in variations with separate optical scanners in the intensity of irradiation that reaches the sensitive body. This has the defect of causing the photographic density to differ at the boundaries and the quality of image to downgrade. To counter this, dust-preventive panes are provided, and as soon as spoiled, they are replaced or cleaned in seeking to recover the irradiation intensity.

In the conventional examples 2 and 3 mentioned above, however, before reprinting is made, an allocation is carried out with regard to whether or not pixels are to be recorded selectively, in pixel units, from among all image data involving a single, entire scanning. Because of this, when a plurality of unit modules are optically scanned in parallel, respective unit modules are recorded in synchronism, whilst the timing of a start made on the recording is asynchronous, a situation that necessitates a separate provision of the means to the selection of the pixels recorded above. This poses a problem of the control system becoming complicated.

SUMMARY OF THE INVENTION

It is an object of this invention to offer an optical scanner and an image forming device that render divided boundaries inconspicuous and improve the image quality.

It is another object of the invention to provide an optical scanner and an image forming device that can not only stabilize the image quality by insuring the uniformity of time-dependent irradiation intensity but can also aim at resource savings through extending the useful life of the device.

The optical scanner according to one aspect of the present invention comprises a plurality of unit modules arranged in a main scanning direction, each unit module having a light source that modulates according to image data and a deflection unit which deflects the light emitted from the light source to scan a surface to be scanned, wherein areas scanned with each unit module are joined together to record the image, wherein the image data includes fixed pixel areas in number equal to the number of the unit modules and which have one scanning line in common with the adjacent fixed pixel area, and variable pixel areas that link up the fixed pixel areas, wherein the image data is constructed by adding pixels of each unit module to the variable pixel areas at a record start side or a record stop side of the fixed pixel areas, and the variable pixel areas are commonly shared between two neighboring unit modules.

The image forming device according to another aspect of the present invention comprises a plurality of unit modules arranged in a main scanning direction, each unit module having a light source that modulates according to image data and a deflection unit which deflects the light emitted from the light source to scan a surface to be scanned, wherein areas scanned with each unit module are joined together to record the image, wherein the image data includes fixed pixel areas in number equal to the number of the unit modules and which have one scanning line in common with the adjacent fixed pixel area, and variable pixel areas that link up the fixed pixel areas, wherein the image data is constructed by adding pixels of each unit module to the variable pixel areas at a record start side or a record stop side of the fixed pixel areas, and the variable pixel areas are commonly shared between two neighboring unit modules; and an optical scanner which performs scanning in the fixed pixel areas and the variable pixel areas, wherein in case of an image formation unit which forms an image of a single color, image recording is performed by dividing image data of one line into pieces equal to the number of the unit modules.

The optical scanner according to another aspect of the present invention comprises a holding unit which holds a plurality of scanning modules arranged in a main scanning direction, each scanning module having a light source that modulates according to image data and a deflection unit which deflects the light emitted from the light source to scan a surface to be scanned; a plurality of image converging units which converge the light beams deflected by the deflection unit into an image; and a housing which houses the holding unit and the image converging units at specific positions, wherein the housing is equipped with an opening through which different light beams from the scanning modules are passed and ejected at the surface to be scanned, the opening being sealed up, wherein the housing is equipped with a window member formed with a monolithic member common to the scanning modules.

The image forming device according to another aspect of the present invention comprises a holding unit which holds a plurality of scanning modules arranged in a main scanning direction, each scanning module having a light source that modulates according to image data and a deflection unit which deflects the light emitted from the light source to scan a surface to be scanned; a plurality of image converging units which converge the light beams deflected by the deflection unit into an image; and a housing which houses the holding unit and the image converging units at specific positions; wherein the housing is equipped with an opening through which different light beams from the scanning modules are passed and ejected at the surface to be scanned, the opening being sealed up, wherein the housing is equipped with a window member formed with a monolithic member common to the scanning modules; an optical scanner which performs scanning in the fixed pixel areas and the variable pixel areas, wherein in case of an image formation unit which forms an image of a single color, image recording is performed by dividing image data of one line into pieces equal to the number of the unit modules.

Other objects and features of this invention will become apparent from the following description with reference to the accompanying drawings.

BRIEF DESCRIPTION OF THE DRAWINGS

FIG. 4 shows the configuration of image data per a single scanning line for individual unit modules in the optical scanner which one embodiment of this invention concerns, FIG. 5 shows the status of the record pixel control in the embodiment of this invention.

DETAILED DESCRIPTIONS

Embodiments of the optical scanner and the image forming device of this invention will be explained in detail by referring to the accompanying drawings.

A first embodiment of this invention will now be explained. Regarding the optical scanner that this invention concerns, it on one hand arranges a plurality of unit modules in the fast scanning direction, unit modules, that is, which are possessed of both a light emitting source that modulates according to image data and a means of deflection, whereby beams of light from the light emitting source is deflected and yet-to-be-scanned surfaces scanned. On the other hand, the optical scanner joins together scanning regions with respect to unit modules and carries out image recording. According to the optical scanner of this invention, image data comprises both the fixed pixel areas divided in numbers equaling those of the modules, in common with a single scanning line, and the variable pixel areas that link up individual fixed pixel areas. At the same time, image data is configured so that variable pixel areas are added to the record start side or record stop side of the fixed pixel areas to which pixels of individual unit modules have each been allotted accordingly. The variable pixel areas are commonly shared between the two neighboring unit modules.

Figure 1:
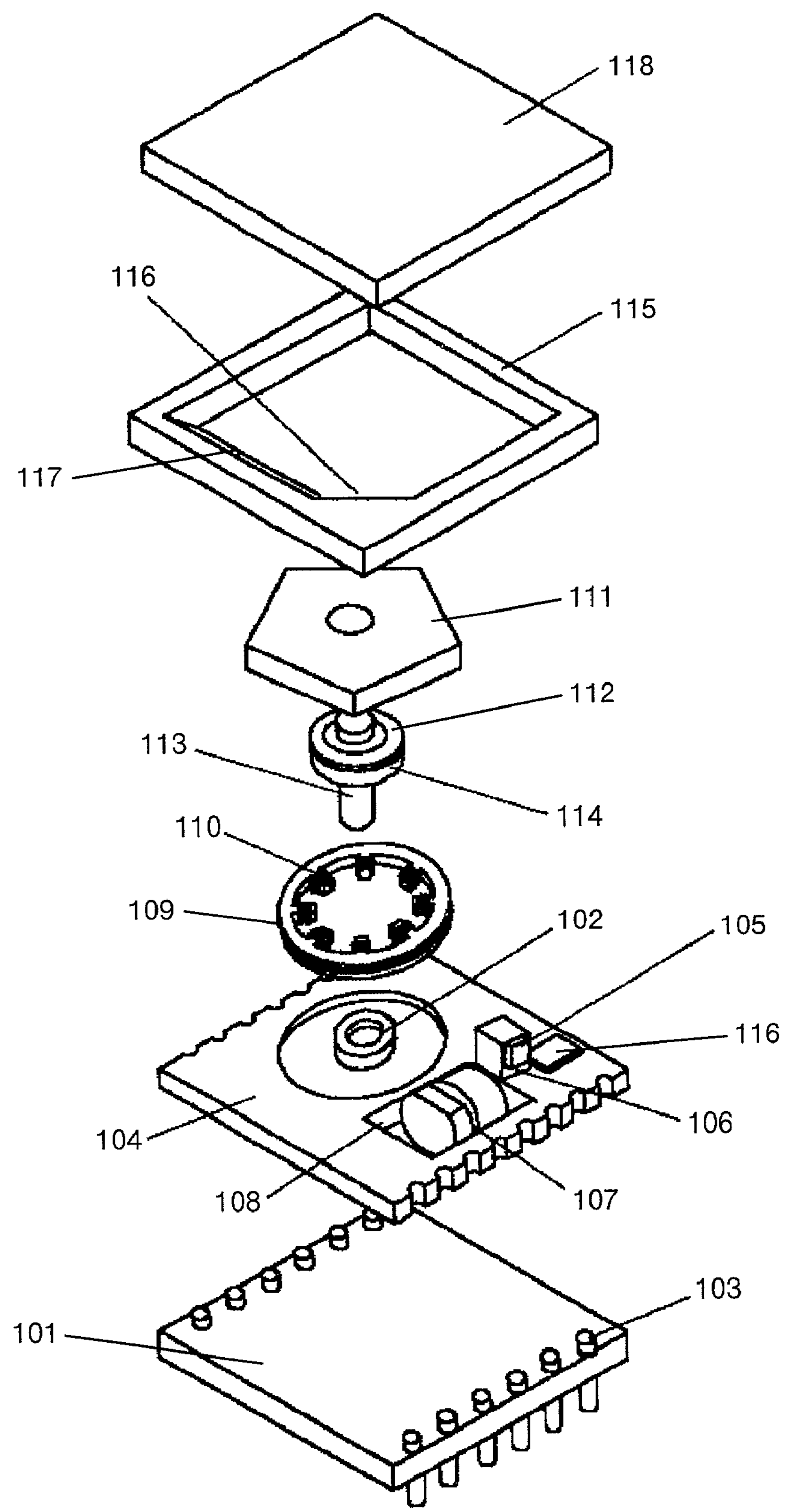
FIG. 1 is an exploded perspective view showing the unit modules in the optical scanner applied in this invention.

FIG. 1 is an exploded perspective view of the unit modules in the optical scanning device applicable to this invention. On the ceramic-molded electrode board 101 are formed a plurality of lead terminals 103 which are wired to external circuits. On the light source board 104, made by metal sintering, are integrally formed the installing face 106 that has installed on it both the bearing 102 in which a sleeve that bears the polygon motor shaft is press-fitted and a semiconductor laser chip 105 that stands perpendicular to board surface, and the V-shaped groove that holds in place the cylindrical surface of the coupling lens 107. Semiconductor laser chip 105 has on its silicon board an AlGaAs layer packed directly by means of the epitaxial technique to form clad layers and active layers that together constitute the semiconductor laser and, as such, is linked up with the installing board 106. The board has also connected to it a made-for monitoring photodiode 116 as bear chips to detect semiconductor laser backlight and is linked up with lead terminals by wire bonding, etc.

When it is strike-connected to V-shaped groove 108, the coupling lens 107 is shaft core-aligned to the semiconductor laser chip 105 inside the face that intersects the optical axis at right angles and when it is adjusted in the direction of the groove, the luminous flux that shoots out from coupling lens 107 runs in the fast scanning direction, i.e., almost parallel to the installing surface before it becomes bonded. The coupling lens 107 is of the two-group configuration, with the front piece constituting an axially symmetric non-spherical lens and the rear one being a cylinder lens curved in the slow scanning direction. Here the light beams that jet out from the semiconductor laser converge linearly on the polygon mirror in the direction of slow scanning.

The coil portion 109 that drives the polygon motor is made up of annular ring-type silicon laminates, with a plurality of inside protrusions individually covered with a winding to form coils. Thus the coil portion is connected concentrically to the board surface relative to the bearings mentioned above.

Further, the polygon mirror 111 is made by the mirror-finishing of aluminum sheet ends, and in FIG. 1, it is shown to be five-faced and held on rotor 112. With shaft 113 press-fitted into it, the rotor 112 is connected with the magnets 114 of the annular type. The magnets 114 have their south poles and north poles alternatively magnetized round the circumference and are arranged face to face inside a plurality of coils. This is how without a motor the polygon mirror 111 rotates as ac voltage is applied to the coils. Concerning the spacer board 115, it is formed by vapor depositing a metal coating on the mirror 116 that reflects beams of light from the coupling lens 107 formed in a frame shape upon leaving the passage in the central portion of the board-back to the polygon mirror 111—as well as by similarly depositing the same on another mirror 117 that reflects upward the beams of light deflected at the polygon mirror 111.

In addition, the sealing plate 118 consists of transparent members and has a semiconductor laser, a polygon mirror and a coupling lens sealed up in the space left when light source 104 and spacer board 115 are sandwiched between the laminates placed between the sealing plate and the electrode board 101.

Figure 2:
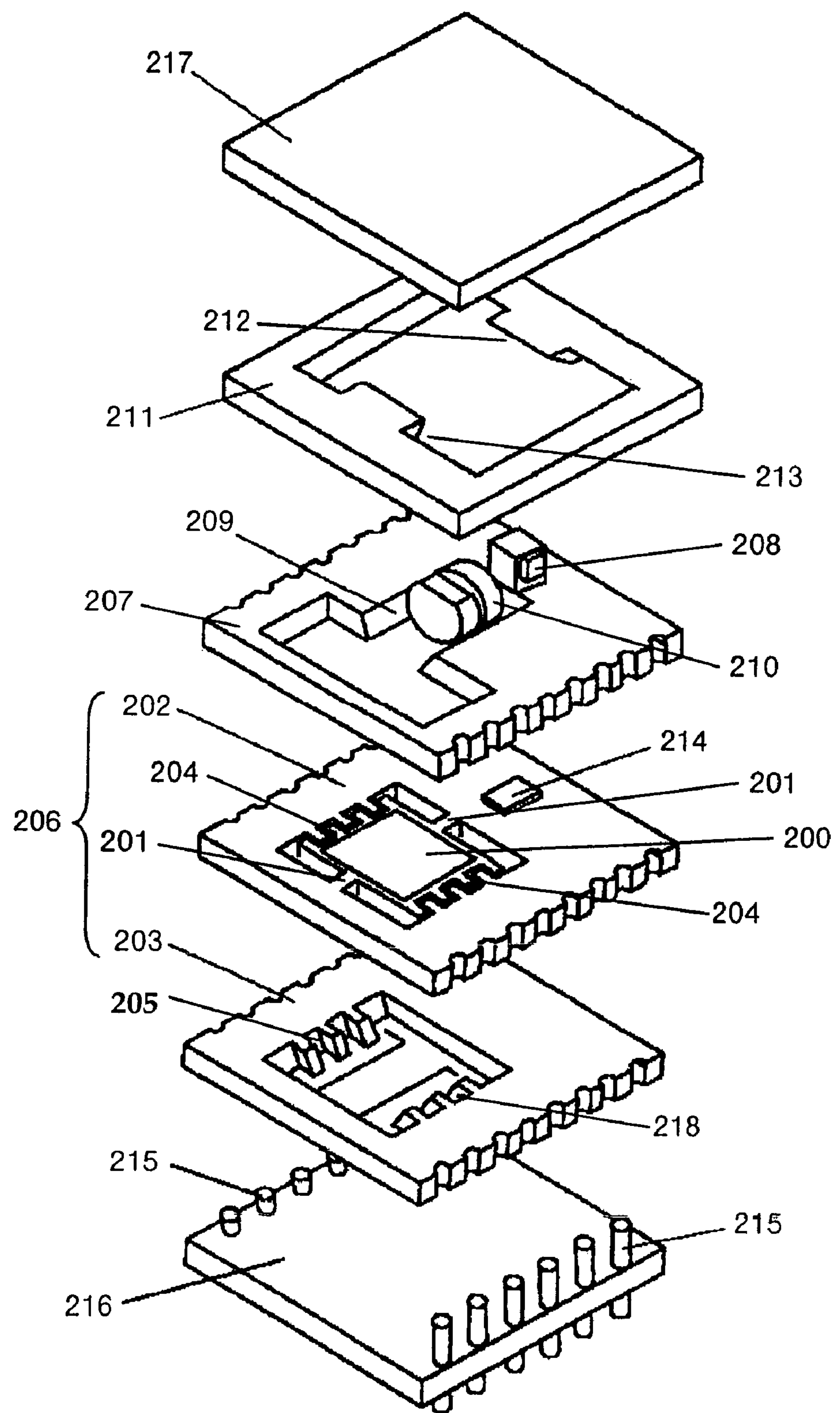
FIG. 2 shows an exploded perspective view showing other unit modules in the optical scanner applied in this invention.

FIG. 2 is an exploded perspective view of the unit modules in another optical scanning device applicable to this invention. The mirror board 206 is made up of two silicon boards put together. Movable mirror 200 and the torsion bar 201 that rotatably bears said movable mirror 200 are formed by etch-piercing the first of the silicon boards 202. The central portion has a metal coating vapor-deposited or is otherwise treated to provide a mirror-like surface, both mirror ends that have a torsion bar 201 sandwiched between them being formed in a flat shape with comb-like projections and depressions and having electrode 204 laid out on the side. As a space for the oscillation of the mirror portion, the second of the two silicon boards is provided with sectionally parabolic depressions, the slopes of which have ups and downs that in comb-fashion overlap in a staggered arrangement at intervals each extending tens of micrometers. This serves as the support board of the movable mirror. On the rugged slopes and on their side down to the sectionally parabolic bottom face are formed fixed electrodes 205 and 218 face-to-face relative to the electrodes 204. When voltage is alternately impressed on these fixed electrodes 205 and 218, electrostatic attraction evolves between the electrodes causing the movable mirror 200 to oscillate and resonant oscillations to follow. On the surface of the first of the two silicon boards is laminarly formed a driving circuit 214 that switches impressed voltage on to the fixed electrodes in accordance with inputted driving frequency. The light source board 207 is formed of sintered metal, etc., with a semiconductor laser chip 208 connected to the installing face formed perpendicularly to the connected face, and similarly with a cylindrical coupling lens 210 linked to the V-shaped groove 209 to complete the board. The coupling lens 210 is of the two-group configuration, with the front piece constituting an axially symmetric non-spherical lens and the rear one being a cylinder lens curved in the slow scanning direction. Formed in a framed state, the spacer board 211 is in place by etch-piercing the central portion of the silicon board. On one internal end of the space board is formed, by the lamination of GaAs layers, etc., the mirror's slant face 212 that turns down the beams of light originating at the aforementioned semiconductor laser, whereas on the other opposite end is similarly formed photodiode 213 that receives back light.

Additionally, the electrode board 216 is formed of ceramic, etc., and has a multiplicity of lead terminals 215 provided to carry out wiring, by means of wire bonding, etc., to semiconductor laser chip 208, photodiode 213 and driving circuit 214 and to thereby establish connections to external circuits.

Further, mirror board 206 light source board 207 and spacer board 211 in that order are lap bonded to the top of the electrode board 216 and are together sealed up in the sealing board 117 to constitute a unit module. Light beams on being ejected from semiconductor laser chip 208 are injected to the movable mirror 200 through coupling lens 210 and terminal mirror 212. The movable mirror carries out reciprocating vibrations with the torsion bar 201 as the rotating shaft and beams are reflected and deflected upward before they are ejected for scanning.

Figure 3:
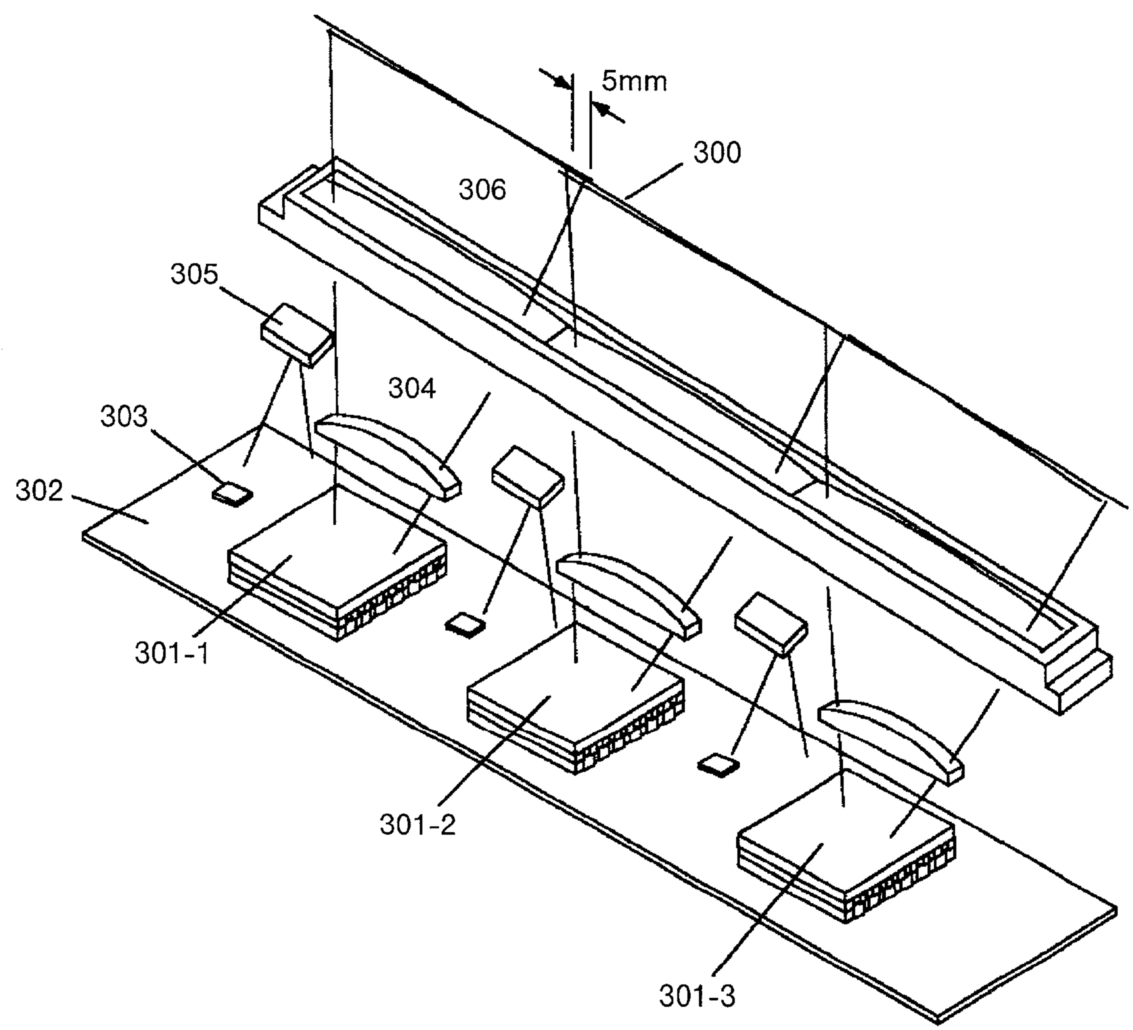
FIG. 3 shows a schematic perspective view showing the configuration of the optical scanner where a plurality of unit modules are arranged.

The unit modules of the optical scanners in any of the above working examples are each laid out in multiple units on the electrical installing board 302, as in FIG. 3, so that a multiplicity of areas into which fast scanning is divided are each given their unit module. At this time, an arrangement is made such that the fast scanning areas of each unit module may overlap by about 5 mm. Electrical installing boards 302 are each furnished with a synchronism-detecting sensor 303 to detect light beams on the scanning start side. By the way, in embodiments in FIG. 3, the number of the unit modules to be arranged is set at 3 and the breadth of recording at each module, at about 75 mm, but they need not be limited thereto. On being ejected from unit modules of such configuration, light beams are formed into images on yet-to-be-scanned face 300 by way of scanning lenses 304 and 306 of the two-sheet construction. Of these scanning lenses, one, namely scanning lens 306, has the lens portion of its module solidly formed of resin. The light beams on being ejected from unit modules are reflected on the mirror 305 laid-out near scanning lens 306, and are injected to the synchronism detecting sensor 303 to generate synchronism detecting signals. A lapse of a certain period of time after their receipt of the signals will find every scanning line start to make records.

FIG. 4 shows the configuration of image data per scanning line of every unit module in the optical scanner that an embodiment of this invention concerns. Image data consists of the fixed pixel area possessed of the number of pixels common to all scanning lines and the variable pixel area where the number of pixels may be common to neighboring unit modules but varies with scanning lines. In this embodiment, an A4 width is recorded in 600 dpi, hence the number of all pixels is set at 5200. The number of pixels allotted to each unit module is 1800. For the unit module 301-1 in FIG. 3, where neighboring modules are absent on the scanning start side, the 100 pixels present on the scanning end side are commonly shared with the scanning start side of unit module 301-1. Concerning the remaining 1700 pixels of the unit module 301-1, they are fixed at each line. Similarly, the 100 pixels on the scanning end side of unit module 301-2 are shared with the scanning start side of unit module 301-3. For the unit module 301-2, the 1600 pixels in the central portion are fixed. In this embodiment, the pixels in the variable pixel area are divided by a single boundary, with the side that adjoins the unit module assumed as effective. Here pixel areas need not be continuous but may well be of separate pixel configuration. Pixel areas may even be divided by two or more boundaries.

FIG. 5 shows the state of record pixel control in this embodiment. Image data must be divided into the fixed area and variable area of pigments according to unit modules and, to accomplish this, the pixels are counted and, in this embodiment, their numbers are distributed in the order of 1700 pixels, 100 pixels, 1600 pixels, 100 pixels, 1700 pixels, for instance. At the mask signal generating step 11, mask signals are generated in such a way that of the 100 pixels allotted to the variable area, the first N-pixels are assumed to be valid, with 100 minus N-pixels that remain assumed to be invalid so as to be blanked. The mask signal generating step then delivers the generated signals, together with data of fixed pixels, to the buffer step 13 that temporarily stores record data of the unit module 301-1 in FIG. 3. On the other hand, to the buffer step 14 that tentatively stores the record data of unit module 301-2 are outputted added data that covers, firstly, the data in which the first N-pixels have, by reversal signals, been invalidated so as to be blanked, with the remaining 100 minus N-pixels assumed valid, secondly, fixed pixel data of the intermediate portion, and thirdly, the data on 100 pixels generated similarly to the above and shared commonly with the unit-module 301-3 in FIG. 3. At this time, invalidated pixels are none other than those the recorded information of which has only been canceled, hence the number of the pixels which are outputted to any of the buffer steps 13 through 15 stands invariably at 1800, moreover, the position of pixels at a start of recording remains constant at all times.

Incidentally, in the first embodiment, the value of N is varied at randomly to N1, N2, N3 and so on at each line and, simultaneously, the pixel positional differentials N2–N1, N3–N2 are prevented from becoming uniform, the idea being to preclude the possibility of the seam pixels in unit modules being arranged rather systematically.

Figure 6:
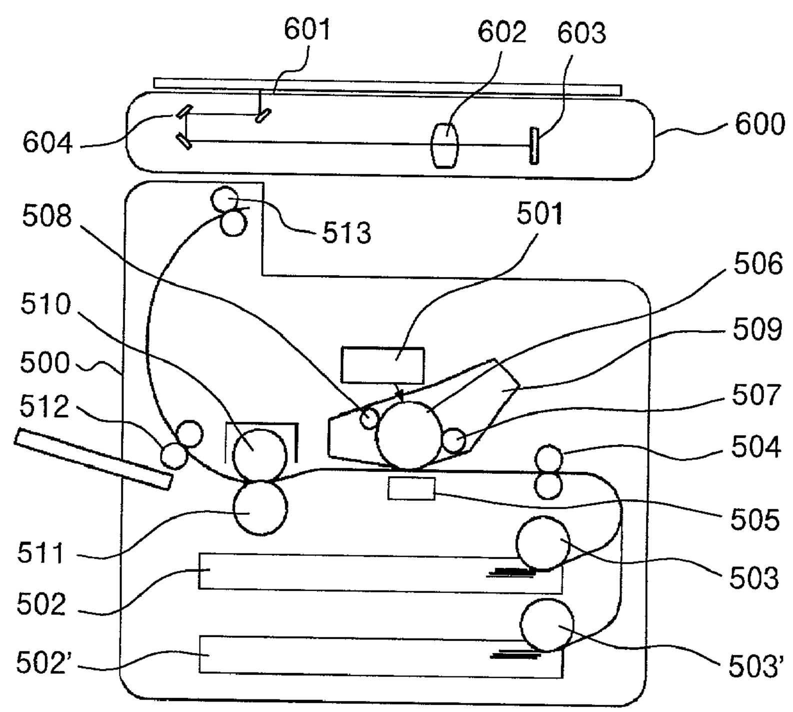
FIG. 6 is a schematic sectional drawing of the configuration of the digital duplicator installed on the optical scanner of this invention.
Figure 7:
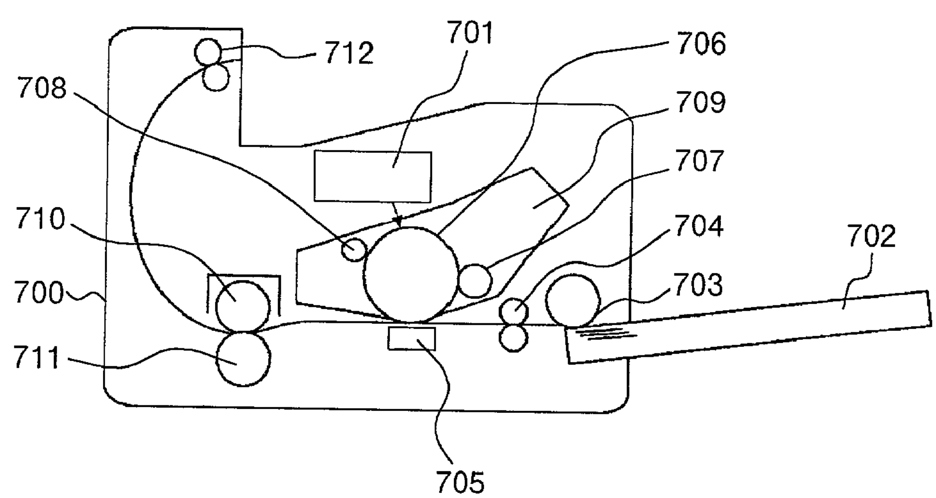
FIG. 7 is a schematic sectional drawing of the configuration of a laser printer installed on the optical scanner of this invention.
Figure 8:
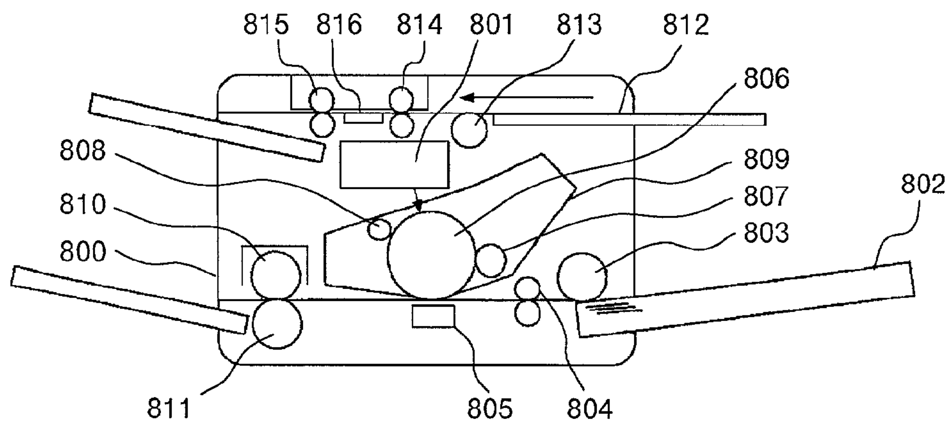
FIG. 8 is a schematic sectional drawing of the configuration of a plain paper facsimile installed on the optical scanner of this invention.

Now as the image forming device in which is used an electronic photo-process mounted with the optical scanner that this invention concerns, its embodiments are given in the form of a digital duplicator in FIG. 6, a laser printer in FIG. 7 and plain paper facsimile in FIG. 8. In FIG. 6, the digital duplicator proper 500 constitutionally includes an optical scanner 501, cassettes 502 and 502' that store sheets, feeding rollers 503 and 503' that take out sheets one at a time from the cassettes 502 and 502', a resist roller 504 that controls transfer timings, a transfer charger 505, a process cartridge 509 in which a photosensitive drum 506, a developing roller 507 and a charging roller 508, etc., are integrated, a fixing device 511 that comprises both a fixing roller 510 with a halogen heater built into it, plus a pressure roller, and a transfer roller 512, and a delivery roller 513. In the optical scanner 501 of the digital duplicator which is configured as above, semiconductor laser is modulated in accordance with image signals, latent images are formed on the photosensitive drum 506 which is uniformly charged by charging roller 508, and these latent images are rendered manifest by the toner that the developing roller 507 supplies. On the other hand, the sheets which are taken out from feeding rollers 503 and 503' are transferred by resist roller 504 in keeping with the timing of image writing by the optical scanner, in which process toner images are transferred accordingly. On being thus transferred, the images are then fixed by means of both fixing roller 510 and fixing device 511 before they are delivered by transfer roller 512, then by delivery roller 513.

Moreover, in the original's readout device proper 600 in FIG. 6, the images on the original's readout unit 601 which is secured to the document glass, are formed on CCD and other photoelectric conversion elements 603 by way of image forming lens 602 and are converted sequentially into electronic data by moving a mirror group 604. By the way, the digital duplicator in FIG. 6 may be a monochrome duplicator, but it is not necessary to limit yourself to it alone, the range of applications being. Needless to say, in the case of full-color duplicators, applications can be found in image forming devices of the types ranging from a type where an optical scanner of this invention is installed with respect to process cartridges colorwise, another type in which said optical scanner is mounted on unit image forming portion where full-color image is formed, and yet another type comprising a plurality of image forming portions.

In FIG. 7, the laser printer 700 constitutionally includes an optical scanner 701, cassette 702 that stores sheets, feeding roller 703 that takes off sheets one at a time from the cassette 702, a resist roller 704 that controls transfer timings, a transfer charger 705, a process cartridge 709 in which a photosensitive drum 706, a developing roller 707 and a charging roller 708, etc., are integrated, a fixing device 711 that comprises both a fixing roller 710 with a halogen heater built into it, plus a pressure roller, and a delivery roller 712. In the optical scanner 701 of the digital duplicator which is configured as above, semiconductor laser is modulated in accordance with image signals, latent images are formed on the photosensitive drum 706 which is uniformly charged by charging roller 708, and these latent images are rendered manifest by the toner that the developing roller 707 supplies. On the other hand, the sheets which are taken off from feeding roller 703 are transferred by resist roller 704 in keeping with the timing of image writing by the optical scanner, in which process toner images are transferred accordingly. On being thus transferred, the images are then fixed by means of both fixing roller 710 and fixing device 711 before they are delivered by delivery roller 712.

In FIG. 8, the plain-paper facsimile 800 constitutionally includes an optical scanner 801, cassette 802 that stores sheets, feeding roller 803 that takes off sheets one at a time from the cassette 802, a resist roller 804 that controls transfer timings, a transfer charger 805, a process cartridge 809 in which a photosensitive drum 806, a developing roller 807 and a charging roller 808, etc., are integrated, a fixing device 811 that comprises both a fixing roller 810 with a halogen heater built into it, plus a pressure roller, a feeding roller 813 that takes off the original from the document glass 812, a pair of transfer rollers 814 and 815 that transfer the original in the slow scanning direction, and a readout portion 816 that optically reads out the original. The images of the original delivered from the document glass by means of feeding roller 813 are sequentially converted to electronic data by readout portion 816, as the images are transferred by a pair of transfer rollers 814 and 815. Concerning the plain-paper duplicator 800, the image signals which as aforesaid are read from the readout portion 816 are transmitted to, or received from, the communication station which is not illustrated. In response to these image signals, the semiconductor laser in the optical scanner 801 is modulated to form latent images on the photosensitive drum 806 charged uniformly by charging roller 808, these latent images being then rendered manifest by the toner that the developing roller 807 supplies. On the other hand, the sheets which are taken from feeding roller 803 are transferred by resist roller 804 in keeping with the timing of image writing by the optical scanner, in which process toner images are transferred accordingly. On being transferred, the images are then fixed and delivered by both fixing roller 810 and fixing device 811.

A second embodiment of this invention will now be explained. The optical scanner that this invention concerns is possessed of both a support base that supports in the fast scanning direction and in a plurality of lines the optical scan modules which are provided with a light emitting source and a deflector that deflects light beams coming from said light emitting source—and a housing that not only positions and supports a multiplicity of image forming steps whereby deflector-scanned light beams are formed into images on yet-to-be-scanned surface relative to separate optical scan modules but also supports said support base. The housing is then furnished with an opening through which different light beams from optical scanning modules are passed and ejected at the surface to be scanned. With the opening sealed up, the housing is also equipped with window members comprising monolithic members common to different optical scanning modules.

Figure 9:
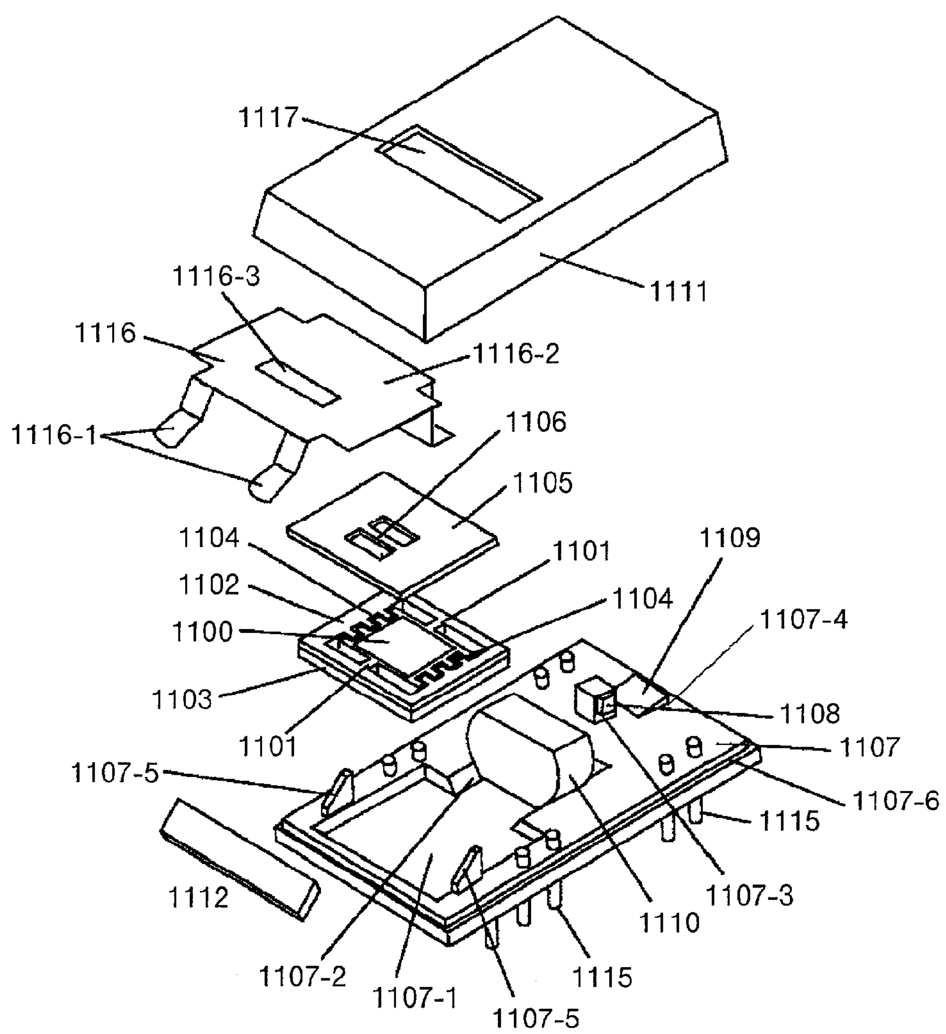
FIG. 9 is an exploded perspective view of the configuration of the optical scanning modules arranged on the optical scanner of embodiment 2 of this invention.

FIG. 9 is an exploded perspective view of the optical unit modules in the optical scanning device applicable to this invention. In this drawing, the movable mirror 1100 is driven by electrostatic attraction. The mirror board is made up of two silicon boards bonded together. Movable mirror 1100 and the torsion bar 1101 that rotatably bears said movable mirror 1100 are formed by etch-piercing the first of the silicon boards 1102. The central portion has a metal coating vapor-deposited or is otherwise treated to provide a mirror-like surface, both mirror ends that have a torsion bar 1101 sandwiched between them being formed in a flat shape with comb-like projections and depressions and having electrode 1104 laid out on the side. As a space for the oscillation of the mirror portion, the second of the two silicon boards 1103 is provided with a pierced passage, the side of which has ups and downs that in comb-fashion overlap in a staggered arrangement to match the shape of movable mirror 1100. This serves as support board for the movable mirror 1100. On the side mentioned above is formed a pair of unillustrated, fixed electrodes opposite to the ends of electrode 1104 and isolated from electrode 1104 in the direction of oscillation. When voltage is alternately impressed on these fixed electrodes, electrostatic attraction evolves between the electrodes, enabling reciprocating vibrations to start with the torsion bar 1101 as the axis of rotation. Incidentally, in this embodiment, driving voltage is reduced by extending the area of the electrodes that stand opposite in comb-shaped fashion. This is not exclusive, however. To the top face of the mirror board is bonded the opposite mirror board 1105, which, too, is formed of silicon board and has the reflecting face 1106 provided on the back face to oppose movable mirror 1100. Beams of light are let in askew at one or the other of the apertures provided in the slow scanning direction and advance in the slow scanning direction while repeating a plurality of reflections between movable mirror 1100 and the surface of reflection 1106. Simultaneously, the angle of scanning is enlarged and light beams are let out at the other aperture. The support board 1107 is formed of sintered metal, etc., and has a lead terminal 1115 inserted in it through the medium of insulating material. On the support board 1107 are formed joining face 1107-1 where the mirror board is joined, the V-groove 1107-2 that positions and adheres coupling lens 1110, the installing face 1107-3 of the LD chip 1108 which is formed perpendicularly to the joining face 1107-1, the installing board 1107-4 of monitor PD chip 1109 that receives LD's backlight, and the butt-joint 1107-5 of silicon board mirror 1112 that turns back to the movable mirror 1100 the beams of light coming from LD chip 1108. The silicon board mirror 1112 is pressed in place by the two inflection points 1116-1 of the flat spring 1116. The flat spring 1116 is provided with the aperture portion 1116-3 that specifies the luminous flux ejected from coupling lens 1110, and an opening 1116-3 through which beams of light deflected by movable mirror 1100 pass, both of which are laid out so as to cover the movable mirror 1100. Of the coupling lens 1110, cylindrical in shape, the first face is a non-spherical surface axially symmetrical, whereas the second face is a cylindrical surface curved in the slow scanning direction. For the V-groove 1107-2, the width and angle are set so that when the cylindrical peripheral face of the coupling lens 1110 establishes direct contact, the optical axis matches the point of luminescence of LD chip 1108, thereby making it possible—through adjustments in the optically axial direction—for divergent luminous flux to become almost parallel luminous flux in the fast scanning direction and for the same divergent luminous flux to become convergent luminous flux in the slow scanning direction, the divergent flux being converged at the movable mirror surface.—hence the intended adhesion and fixing are attained. LD chips 1108 and monitor PD chips 1109, these fixed electrodes mentioned above are connected by wire bonding to the ends protruding on the upper side of their respective lead terminals. Cover 1111 is formed into the shape of a cap by sheet metal working, its opening at which light beams are ejected is joined with a glass sheet 1117, and they together are inserted into the steps 1107-6 provided round the circumference of support board 1107 and constitute an optical scanning module with the mirror board and other support faces sealed up. Concerning the inner pack, you may well seal into it a gas suitable for bear chip preservation, or you may choose to bring the gaseous pressure below the external atmospheric pressure to reduce the air resistance of the movable mirror. An example of using a movable mirror as a means of deflection has been given, but the effect is the same if you employ a polygon mirror, etc.

Figure 10:
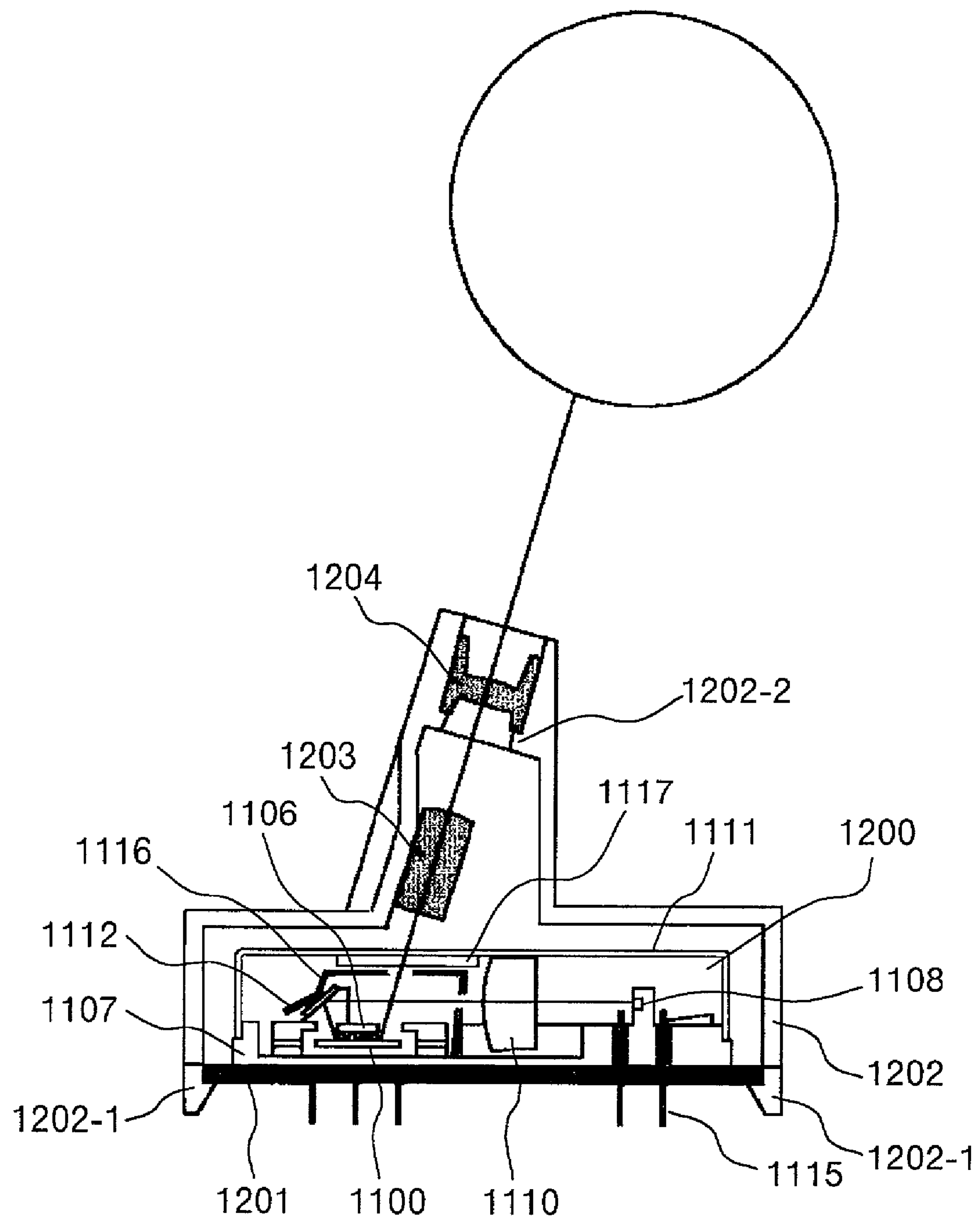
FIG. 10 is a sectional view of the configuration of the optical scanner that possesses the optical scanning modules given in FIG. 9.
Figure 11:
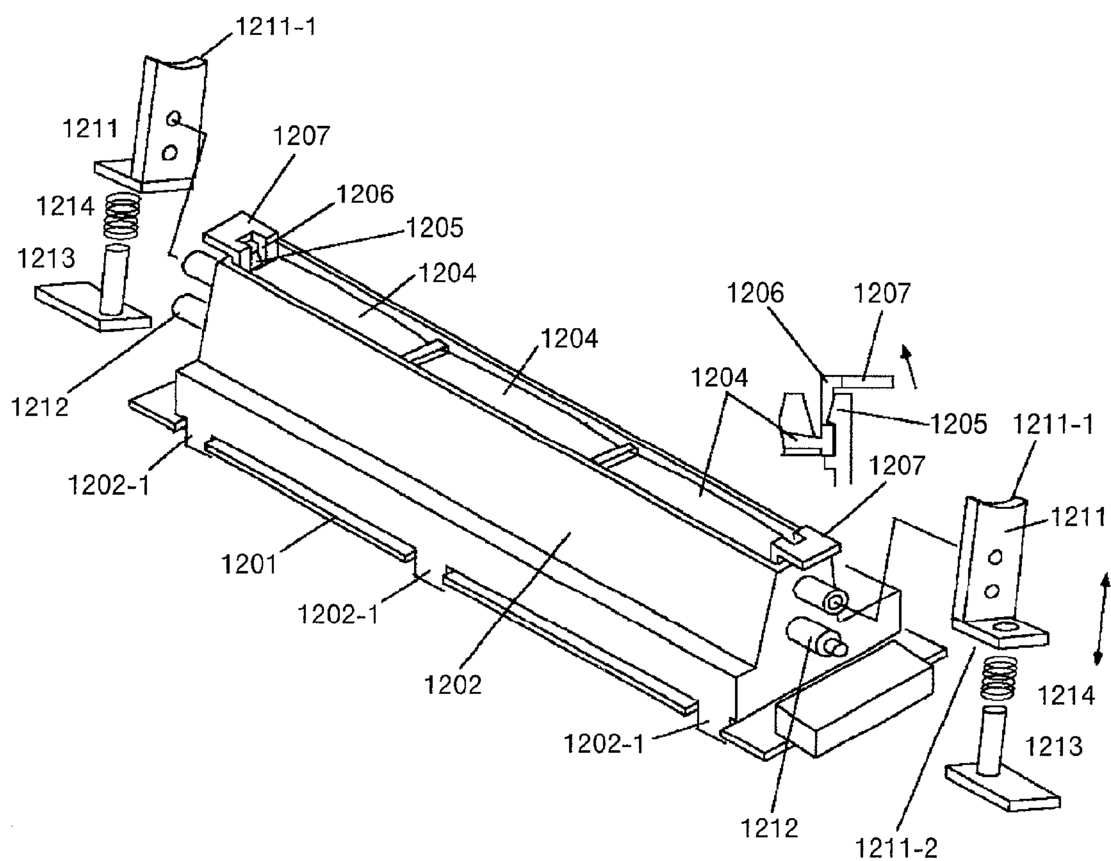
FIG. 11 is a perspective view of the outside appearance of the optical scanner of embodiment 2 of this invention.
Figure 12:
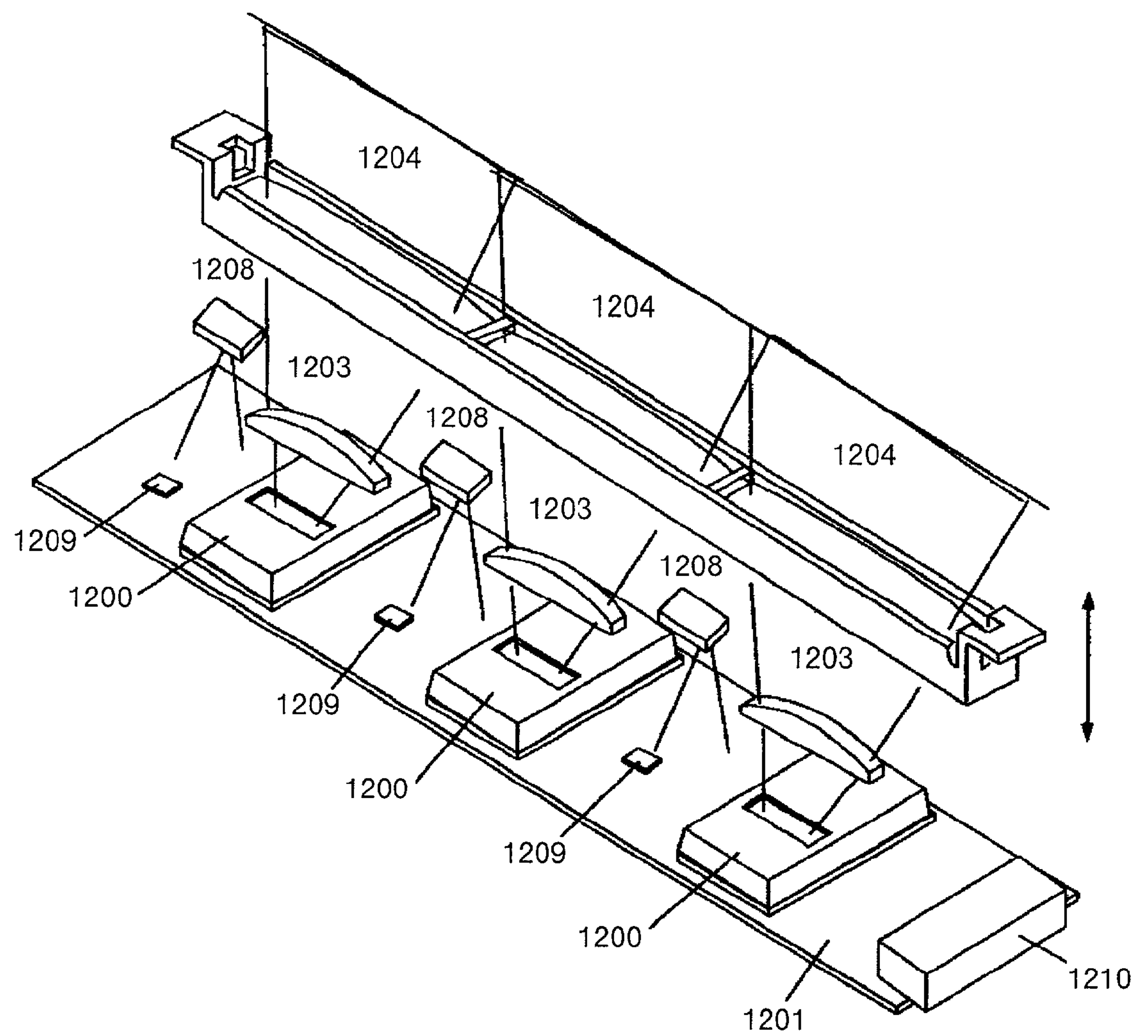
FIG. 12 is a perspective view of the configuration of the optical scanner of embodiment 2 of this invention.

FIG. 10 shows the sectional view an optical scanner furnished with an optical scanning module of FIG. 9. FIG. 11 shows its outside appearance, while FIG. 12 is the perspective view. Regarding the optical scanning modules 1200 given in FIG. 10, a plurality of them are arranged in the fast scanning direction on a print board 1201 where electronic parts that constitute the driving circuits of a movable mirror are installed. This in the case of the present embodiment is three optical scanning modules being installed. In installing, the bottom face of the support board 1107, with its lead terminals 1115 protruding downward, is snapped via through-hole into an unillustrated print board and is tentatively steadied after a positional alignment is made between optical scanning modules on the board within the through-hole clearance. This is followed by their batch securing with other electronic parts by soldering. The print board 1201 that supports a plurality of optical scanning modules 1200 is so snap-fitted as to block the opening on the lower side of the housing 1202 and is held snugly embraced between a pair of snap pawls provided solidly with the housing 1202. Inside the housing 1202 are formed the positioning face where the first scanning lens 1203 is arranged and joined in the fast scanning direction, another positing portion where the second scanning lens 1204 is held in place, and the holding portion for the synchronous mirror 1208 shown in FIG. 12. In this embodiment, the second scanning lens is solidly formed with resin and is mounted from outside to the opening for light beam ejection. As illustrated in FIG. 11, on both ends of the housing in the longitudinal direction are formed lugs 1207 possessed of a notch 1206 that interlocks with the protrusion 1205 provided on the inside walls of the housing 1202, with the second scanning lens being pressed against the reference plane 1202-2 because of this interlock and simultaneously being positioned in the fast scanning direction. It is also structured such that by being raised in the arrow direction the second scanning lens may be mounted or demounted quite easily. Between the lenses are provided a rib that separates the scanning areas adjacent to each other, this being to prevent the beams of light that pass through the troughs between curvatures from getting split to raise a ghost. The synchronous mirror 1208 in FIG. 12 reflects beams of light on the scanning start side of each optical scanning module and leads the beams to a synchronism detecting sensor 1209, an example being, say, PIN photodiode installed on a print board 1201, thereby causing synchronism detecting signals to arise and a start on recording to be timed. The connector 1210 is devised so that it may carry out power supply to all optical scanning modules, data signaling and/or other relevant exchanges en bloc. As FIG. 11 shows, both sides of the housing 1202 are furnished with positioning members 1211 that have a striking face 1211-1 provided to match the spherical periphery provided to the cartridge for holding the photosensitive drums explained later on. Positioning members 1211 are screw-safetyed to the protrusions 1212, thereupon the mating holes in the bearing surface 1211-2 are through-deployed to the pins 1213 in the optical scanner proper through the means of the springs 1214. This permits the housing as a whole to be held movable along the pins in the arrow direction, which in turn renders it possible for the housing to maintain the state of being pressed by the cartridge at all times. This renders possible the collective positioning relative to the faces to be scanned in a multiplicity of optical scanning modules. By the way, in the embodiments, the number in which optical scanning modules are arranged is set to three, but the number is not the limit but may well be increased or decreased according to the breadth of recording by fast scanning.

Figure 13:
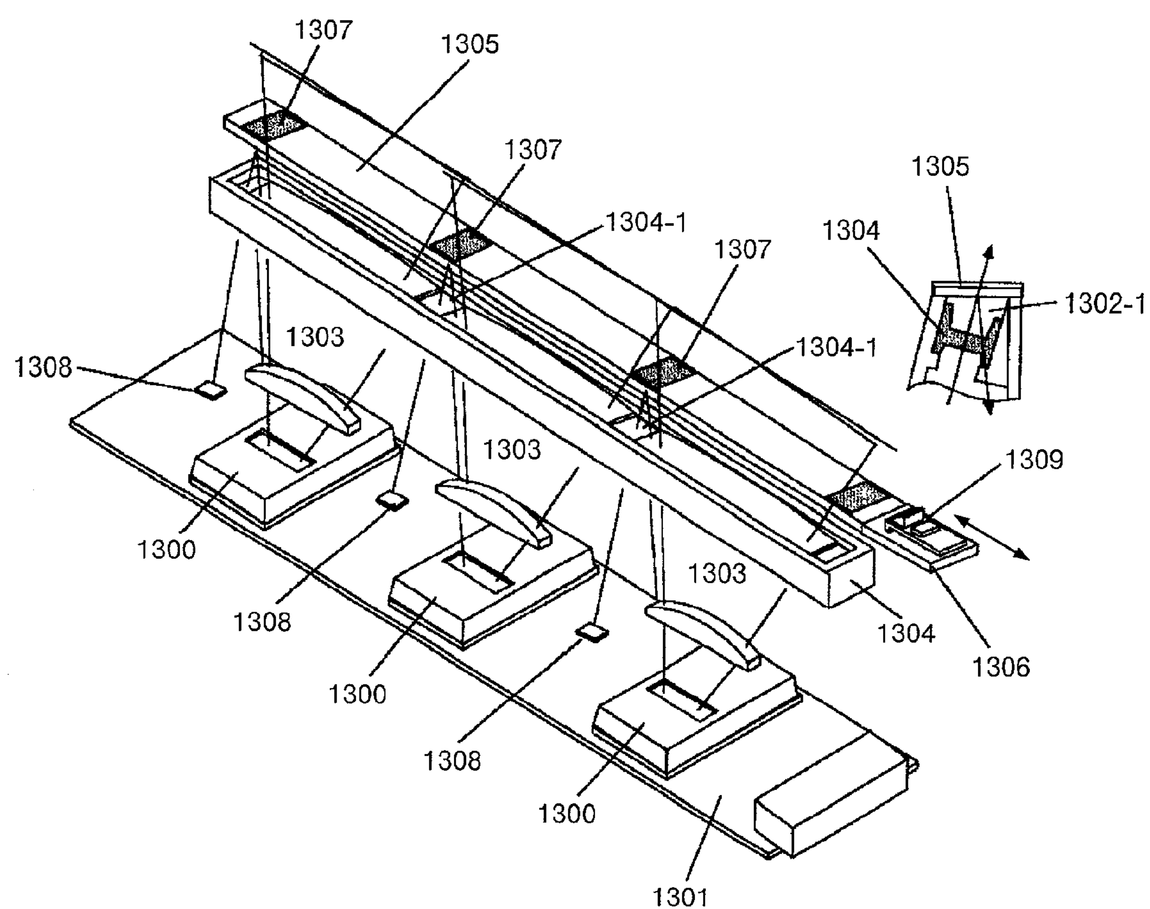
FIG. 13 is a perspective view of the configuration of the optical scanner that an embodiment of this invention concerns.
Figure 14:
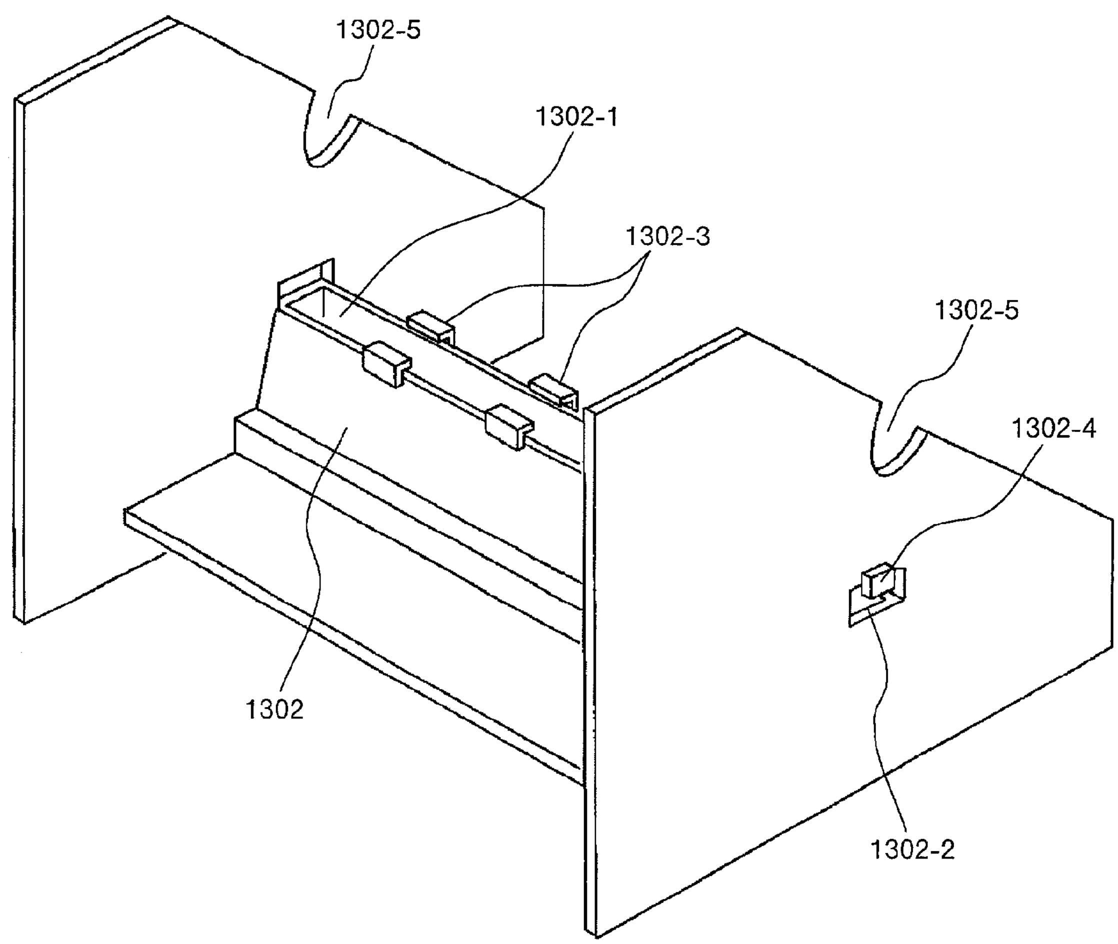
FIG. 14 is a perspective view of the holding members that hold in place the optical scanner of this invention.
Figure 15:
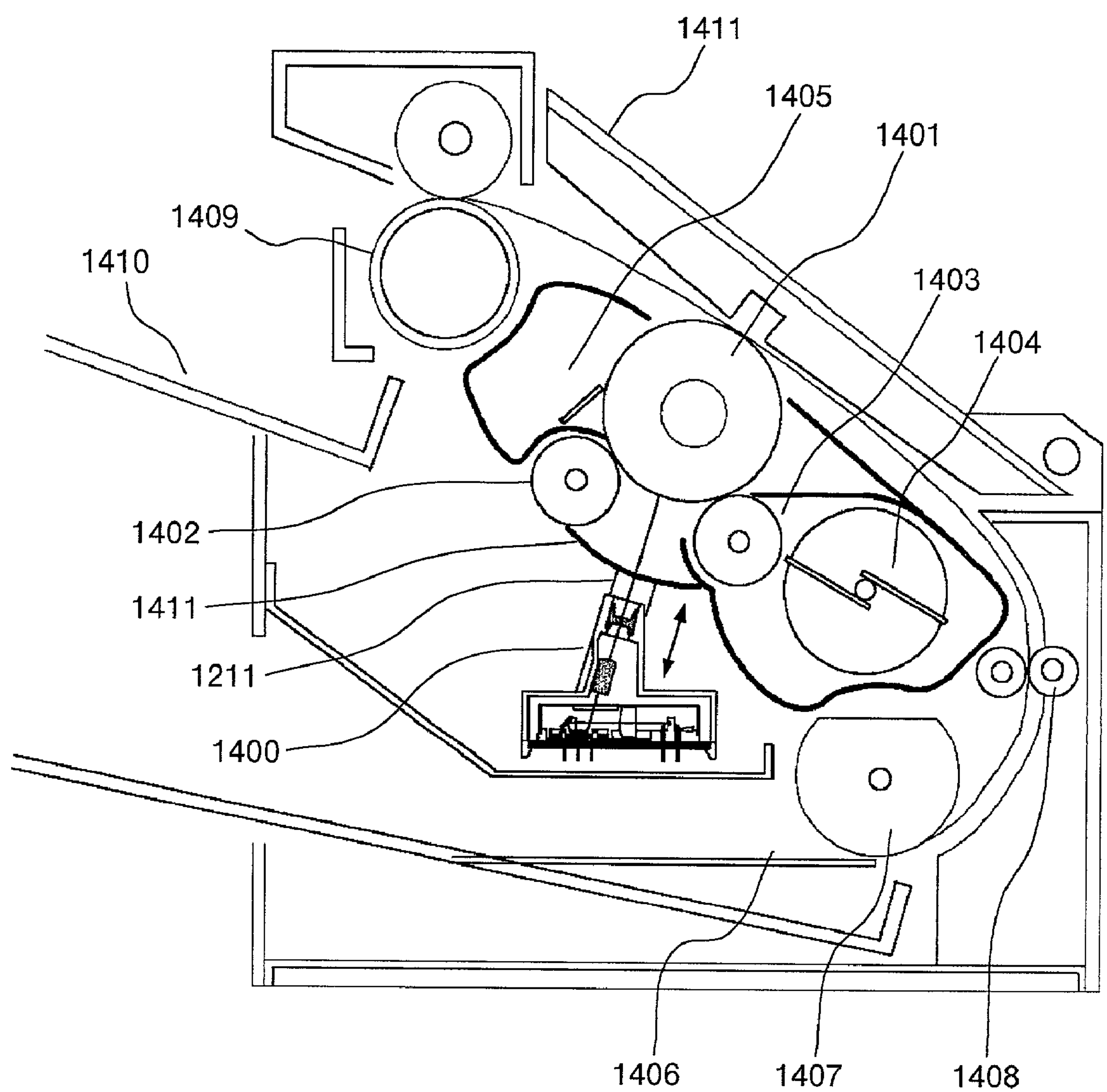
FIG. 15 is a schematic sectional view of the configuration of the laser printer installed on the optical scanner of this invention.

FIG. 13 shows a perspective view of the configuration of the optical scanner that an embodiment of this invention concerns. In this embodiment, dust-preventive plates 1305 are provided separately from scanning lens. The configuration of the optical scanning module 1300 is the same as that given in FIG. 9, so explanations are abridge. As FIG. 14 depicts, the housing 1302 is plastic-formed solidly with the side plates that constitute the optical scanner body frame. The shape of the interiors of the housing 1302 is the same as the one given in FIG. 10, with the first scanning lens 1303 is laid out and joined inside the housing 1302 in the fast scanning direction. The second scanning lens 1304 is similarly formed in one piece, and is mounted from outside on the opening 1302-1, at which the beams of light of the housing 1302 are ejected. Between the second scanning lenses 1304 is formed a flat plane 1304-1, devoid of a curvature, that keeps the scanning areas separated. As is clear from FIG. 14, the dust preventive plate 1305 is inserted at the square hole made in the side plate, and is supported in an embraced fashion by key-like protrusions 1302-3 on the housing 1302, the object being to plug up the opening 1302. Multiple reflections must be prevented from occurring between the plate face of the dust preventive plate 1305 and the second scanning lens surface, and to this end, said plate face is laid out at a prescribed angle relative to the optical axis. For the dust preventive plate 1305, a mirror 1307 is formed by vapor-depositing a metal coating on the plate's rear surface between different optical scanning areas in order that the light beams from other than the effective scanning areas, say, those light beams before and after synchronism detection, are prevented from reaching adjacent yet-to-be scanned surfaces. Simultaneously, it is also to allow the light beams for the detection of synchronisms to be reflected by the metal-coated mirror 1307, then to pass through the flat surface 1304-1 between the second scanning lenses 1304, and to enter the synchronism detecting sensor 1308 installed on the print board 1301. The flat plane 1304-1 may well be curved, at least in the slow scanning direction, on its upper or lower surfaces, the purpose being to allow light beams to positively converge on the synchronism detecting sensor 1308. The lug 1306 is provided by being joined to the end of the dust preventive plate 1305 and is possessed of a knob, a solidly formed snap pawl 1309. It is structured such that the snap pawl 1309 is interlocked with the protrusions 1302-4 of the side plate in FIG. 14 to carry out positioning in the fast scanning direction and to permit easy mounting and demounting. The notch 1302-5 is a strike face engineered to match the cylindrical periphery provided on the cartridge—concentrically to the drum—for the holding of the sensitive drum and, as such, it is possible to collectively carry out positioning relative to the yet-to-be scanned surfaces of a plurality of optical scanning modules FIG. 15 is a schematic sectional view of an example of the optical scanner of this invention, applied to a laser printer. In this drawing, the photosensitive drum 1401 is found surrounded by the charging (electrifying) roller 1402 that electrically charges the photosensitive body to a high voltage, the developing roller 1403 that adheres a toner to the electrostatically latent images recorded on the optical scanner 1400 to turn them to sensible (manifest) images, and the toner hopper 1404 that stockpiles toner, and the cleaning case 1405 that using a blade scrapes off and stores residual toner left over from its transfer to sheets, which altogether solidly constitute a replaceable cartridge. Sheets are fed from a feeding tray 1406 to a feeding roller 1407 and are transferred anticlockwise. A pair of resist rollers 1408 sends sheets in matching with the timing of setting, images are transferred by photosensitive drum 1401 that rotates in the same direction, the images being then fixed on the sheet by a fixing roller 1409 and delivered to the delivery tray 1410. The cartridge's scanner cover 1411 is rotatably borne on the shaft and is opened at cartridge replacement or when jamming necessitate sheet extraction. The second scanning lens can be replaced by cartridge removal.

As other image forming devices in which is used an electrophotographing process installed with the optical scanner covered by the above-described embodiments, it is possible to give as examples a digital duplicator shown in FIG. 6 and a plain-paper facsimile in FIG. 8

This invention is in no way limited to the above embodiments and, needless to say, many types of deformations or replacements are possible if and only if they are within the scope of the patent claims.

Concerning the optical scanner that this invention concerns, it on one hand arranges a plurality of unit modules in the fast scanning direction, unit modules, that is, which are possessed of both a light emitting source that modulates according to image data and a means of deflection, whereby beams of light from the light emitting source are deflected and yet-to-be-scanned surfaces scanned. On the other hand, the optical scanner joins together scanning regions with respect to unit modules and carries out image recording. According to the optical scanner of this invention, image data comprises both the fixed pixel areas divided in numbers equaling those of the modules, in common with a single scanning line, and the variable pixel areas that link up individual fixed pixel areas. At the same time, image data is configured so that variable pixel areas are added to the record start side or record stop side of the fixed pixel areas to which pixels of individual unit modules have each been allotted accordingly. Characteristically, the variable pixel areas are commonly shared between the two neighboring unit modules. Hence there arises no need to separately provide the means of selecting record pixels. Moreover, the control system of said means can be simplified; the numbers in which pixels are allotted accordingly to each of the unit modules can also be increased or decreased arbitrarily according to every scan line. Thus the boundaries of division become hard to discern and the images obtainable are nice to look at.

Additionally, a mask signal generating step is provided that generates mask signals as soon as part of the pixels in the variable pixel area turn invalid at one or the other of the neighboring unit modules. With a provision of this step, the changing of the number of pixels is not necessary, nor is there any need to shifting the record start position or to adding excess delay circuits, etc. This brings the deviation in the fast scanning position to the minimum at every scanning line and provides nice images to watch.

Further, the pixel boundaries divided by the mask signal step may be shifted between the separate scan lines and this plus the fact that the amount of shift at the mask generating step differs at least between the neighboring scan lines, makes it possible for the divided positions not to arrange themselves regularly at the neighboring scan lines. Thus it becomes difficult to discern the divided positions and, as a result, good images are obtainable.

In addition, the image forming device that this invention concerns is characterized by the fact that relative to the image forming portion where monochromatic images are formed, it does image recording by dividing the image data of full one line into the number equaling that of unit modules.

Furthermore, the image forming device of this invention is characterized by it being deployed at each of the color-wise image forming portions where full-color images are formed and separately recording images in accordance with the image data for different colors.

The image forming device of this invention is also characterized by it being deployed in common for color-wise image forming portions where full-color images are formed and separately recording images in accordance with the image data for different colors.

In addition, the image forming device of this invention is installed in common for one or a multiplicity of colors at color-wise image forming portions where full-color images are formed and recording is made of images in time series in accordance with the image data for different colors, a feature that also characterizes this device.

Moreover, the optical scanner that this invention concerns is possessed of both a support base that supports in the fast scanning direction and in a plurality of lines the optical scanning modules which are provided with a light emitting source and a deflector that deflects light beams coming from said light emitting source—and a housing that not only positions and supports a multiplicity of image forming steps whereby deflector-scanned light beams are formed into images on yet-to-be-scanned surface relative to separate optical scanning modules but also supports said support base. The housing is furnished with an opening through which different light beams from optical scanning modules are passed and ejected at the surface to be scanned. With the opening sealed up, the housing is also equipped with window members comprising monolithic members common to different optical scanning modules. This renders constant the extent of time-dependent spoil on the window members, insures the uniformity of the amount of transmitted light for each optical scan module even after replacements, cleaning or other maintenance work, and makes possible the outputting of fine images devoid of density differentials. It is also possible that since the angles set between optical scanning modules are the same and since their replacement is not accompanied by relative errors, there arise no bend in scanning lines nor changes in other optical properties, much to the great advantage of obtaining good image outputs.

To add to this, the window members are held freely detachable from the housing and has a means of stopping or otherwise involving itself as necessary to effect a fig positional control by stopping or otherwise involving itself in the direction of the arrangement of optical scanning modules. Due to this, when window members are replaced periodically, it is positively feasible to align each optical scanning modules with the optical scanning areas of window members relative thereto. This is why at all times in service stable optical properties are insured and good image outputs obtainable.

Additionally, window members constitute a part of the image forming step and as such they dispense with the need to install dust-preventive panes or other extra optical elements, much to the benefit of decreased scatter in the amount of transmitted light between optical scanning modules, improved image outputs, reduced numbers of parts, and higher production efficiencies.

Further, the window members have the non-transmitting region provided between the light beam transmitting areas of the neighboring optical scanning modules, which prevents the beams of light unrelated to image recording from leaking outside the window members. When light beams are turned on outside the scanning areas, they in no way irradiate yet-to-be-scanned areas in the neighborhood even in the case of synchronous detection or light quantity determination. Hence good image outputs can be obtained.

Furthermore, concerning the means of synchronism detection mounted on the support base, a means whereby the beam position at a start or end of scanning by individual scanning modules is detected to attain a synchronism with a start on recording, a provision is made of another means of reflection by which light beams are channeled from the optical scanning modules to the synchronism detecting means. This renders it possible for beams of light outside the scanning area to be positively enclosed in spaces between stored members and for the light beams on return by reflection to be used for the detection of synchronism. This in turn dispenses with the necessity of providing a synchronism detecting mirror, curtails the number of parts on hand, and improves production efficiency.

Characteristically, the image forming device of this invention is mounted with the above-mentioned optical scanning device and performs image recording by dividing the image data for a single line in numbers equaling those of the unit modules.

The present document incorporates by reference the entire contents of Japanese priority document, 2001-125270 filed in Japan on Apr. 24, 2001 and 2001-125542 filed in Japan on Apr. 24, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanner comprising:

a plurality of unit modules arranged in a main scanning direction, each unit module having a light source that modulates according to image data and a deflection unit which deflects the light emitted from the light source to scan a surface to be scanned, wherein areas scanned with each unit module are joined together to record the image, wherein the image data includes fixed pixel areas in number equal to the number of the unit modules and which have one scanning line in common with the adjacent fixed pixel area, and variable pixel areas that link up the fixed pixel areas, wherein the image data is constructed by adding pixels of each unit module to the variable pixel areas at a record start side or a record stop side of the fixed pixel areas, and the variable pixel areas are commonly shared between two neighboring unit modules; and a mask signal generating unit that generates mask signals as soon as part of the pixels in the variable pixel area turn invalid with respect to one or the other of the unit modules adjacent to each other.

2. The optical scanner according to claim 1, wherein the pixel boundaries divided by the mask signal unit are shifted between the separate scanning lines.

3. The optical scanner according to claim 2, wherein the amount of shift provided by the mask signal generating unit differs between the neighboring scanning lines at least.

4. An optical scanner comprising:

a plurality of unit modules arranged in a main scanning direction, each unit module having a light source that modulates according to image data and a deflection unit which deflects the light emitted from the light source to scan a surface to be scanned, wherein areas scanned with each unit module are joined together to record the image, wherein the image data includes fixed pixel areas in number equal to the number of the unit modules and which have one scanning line in common with the adjacent fixed pixel area, and variable pixel areas that link up the fixed pixel areas, wherein the image data is constructed by adding pixels of each unit module to the variable pixel areas at a record start side or a record stop side of the fixed pixel areas, and the variable pixel areas are commonly shared between two neighboring unit modules; and an optical scanner which performs scanning in the fixed pixel areas and the variable pixel areas, wherein in case of an image formation unit which forms an image of a single color, image recording is performed by dividing image data of one line into pieces equal to the number of the unit modules.

5. The image forming device according to claim 4, wherein the image forming device is deployed at each of a color-wise image forming units for forming a full-color image and images are separately recorded in accordance with the image data for different colors.

6. The image forming device according to claim 4, wherein the image forming device is deployed in common for color-wise image forming units for forming a full-color image and images are separately recorded in time series relative to different colors.

7. The image forming device according to claim 4, wherein the image forming device is installed in common for one or more of colors in color-wise image forming units for forming a full-color image and images are recorded in time series, based on image data for different colors.

8. An optical scanner comprising:

a holding unit which holds a plurality of scanning modules arranged in a main scanning direction, each scanning module having a light source that modulates according to image data and a deflection unit which deflects the light emitted from the light source to scan a surface to be scanned;

a plurality of image converging units which converge the light beams deflected by the deflection unit into an image; and a housing which houses the holding unit and the image converging units at specific positions, wherein the housing is equipped with an opening through which different light beams from the scanning modules are passed and ejected at the surface to be scanned, the opening being sealed up, wherein the housing is equipped with a window member formed with a monolithic member common to the scanning modules.

9. The optical scanner according to claim 8, wherein the window member is held freely detachable from the housing.

10. The optical scanner according to claim 8, wherein the window members have an involving unit that involves in the direction in which the optical scanning modules are arranged and of exercising their positional control.

11. The optical scanner according to claim 8, the window members constitute a part of the image forming unit.

12. The optical scanner according to claim 8, wherein the window members are possessed of the non-transmitting region between the light beam transmitting areas of the neighboring scanning modules.

13. An optical scanner comprising:

a plurality of unit modules arranged in a main scanning direction, each unit module having a light source that modulates according to image data and a deflection unit which deflects the light emitted from the light source to scan a surface to be scanned, wherein areas scanned with each unit module are joined together to record the image, wherein the image data includes fixed pixel areas in number equal to the number of the unit modules and which have one scanning line in common with the adjacent fixed pixel area, and variable pixel areas that link up the fixed pixel areas, wherein the image data is constructed by adding pixels of each unit module to the variable pixel areas at a record start side or a record stop side of the fixed pixel areas, and the variable pixel areas are commonly shared between two neighboring unit modules, and wherein a provision is made of the means whereby the beam position at the start or end of scanning by individual scanning modules is detected to attain a synchronism with a start on recording, a means where a reflection step is added to the synchronism detecting step to guide light beams from the aforementioned optical scanning modules to the synchronism detection step.

14. An optical scanner comprising:

a holding unit which holds a plurality of scanning modules arranged in a main scanning direction, each scanning module having a light source that modulates according to image data and a deflection unit which deflects the light emitted from the light source to scan a surface to be scanned;

a plurality of image converging units which converge the light beams deflected by the deflection unit into an image; and a housing which houses the holding unit and the image converging units at specific positions;

wherein the housing is equipped with an opening through which different light beams from the scanning modules are passed and ejected at the surface to be scanned, the opening being sealed up, wherein the housing is equipped with a window member formed with a monolithic member common to the scanning modules;

an optical scanner which performs scanning in the fixed pixel areas and the variable pixel areas, wherein in case of an image formation unit which forms an image of a single color, image recording is performed by dividing image data of one line into pieces equal to the number of the unit modules.

15. The image forming device according to claim 14, the image forming device is deployed at each of the color-wise image forming units for forming a full-color image and separately images are separately recorded in accordance with the image data for different colors.

16. The image forming device according to claim 14, wherein the image forming device is deployed in common for color-wise image forming units for forming a full-color image and images are separately recorded in time series relative to different colors.

17. The image forming device according to claim 14, wherein the image forming device is installed in common for one or more of colors in color-wise image forming units for forming a full-color image and images are recorded in time series, based on image data for different colors.

* * * * *